United States Patent
Nalewajek et al.

(10) Patent No.: US 6,486,114 B2
(45) Date of Patent: *Nov. 26, 2002

(54) AZEOTROPE-LIKE COMPOSITION OF PENTAFLUOROPROPANE AND A PERFLUORINATED FLUOROCARBON HAVING 5 TO 7 CARBON ATOMS OR N-METHYLPERFLUOROMOROPHOLINE OR N-ETHYLPERFLUOROMORPHOLINE

(75) Inventors: David Nalewajek, West Seneca, NY (US); Earl A. E. Lund, deceased, late of West Seneca, NY (US), by Hilde Lund, legal representative; David P. Wilson, East Amherst, NY (US)

(73) Assignee: Electric Power Research Institute, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,000

(22) Filed: Sep. 28, 1998

(65) Prior Publication Data

US 2001/0012827 A1 Aug. 9, 2001

Related U.S. Application Data

(63) Continuation of application No. 08/313,364, filed on Sep. 27, 1994.

(51) Int. Cl.$^7$ ................................................. C09K 5/04
(52) U.S. Cl. ........................................ 510/408; 252/67
(58) Field of Search .............................. 510/408; 252/67

(56) References Cited

U.S. PATENT DOCUMENTS

| | | | |
|---|---|---|---|
| 5,130,345 A | | 7/1992 | Li et al. ...................... 521/131 |
| 5,350,777 A | * | 9/1994 | Yuge et al. .................. 521/117 |
| 5,494,601 A | * | 2/1996 | Flynn et al. .................. 252/67 |

FOREIGN PATENT DOCUMENTS

| | | | | |
|---|---|---|---|---|
| GB | 2274462 | * | 7/1994 | |
| WO | 93/02150 | * | 2/1993 | |
| WO | WO9402563 | | 2/1994 | ............ C09K/5/04 |
| WO | WO9422973 | | 10/1994 | ............ C09K/5/04 |
| WO | WO9508603 | | 3/1995 | ............ C09K/5/04 |
| WO | WO9610063 | | 4/1996 | ............ C09K/5/04 |

OTHER PUBLICATIONS

Abstract, Database WPI, Week 9521, Derwent Publications Ltd., London, GB, AN 95–159086 & JP,A,70 082 405 (Matsushita). Mar. 28, 1995.

* cited by examiner

Primary Examiner—Gregory E. Webb
(74) Attorney, Agent, or Firm—Peters, Verny, Jones & Schmitt, L.L.P.; Howard M. Peters

(57) ABSTRACT

Azeotrope-like compositions comprising pentafluoropropane and a perfluorocarbon having 5 to 7 carbon atoms or N-methylperfluoromorpholine OR N-ethylperfluoromorpholine are stable and have utility as refrigerants for heating and cooling, blowing agents, solvents and fire extinguishing agents.

13 Claims, No Drawings

AZEOTROPE-LIKE COMPOSITION OF PENTAFLUOROPROPANE AND A PERFLUORINATED FLUOROCARBON HAVING 5 TO 7 CARBON ATOMS OR N-METHYLPERFLUOROMOROPHOLINE OR N-ETHYLPERFLUOROMORPHOLINE

This is a continuation of U.S. Ser. No. 08/313,364 filed Sep. 27, 1994.

FIELD OF THE INVENTION

This invention relates to azeotrope-like or essentially constant-boiling mixtures of pentafluoropropane and a perfluorinated fluorocarbon having 5 to 7 carbon atoms or N-methylperfluoromorpholine or N-ethylperfluoromorpholine. These mixtures are useful as refrigerants for heating and cooling.

BACKGROUND OF THE INVENTION

Fluorocarbon based fluids have found widespread use in industry for refrigeration applications such as air conditioning and heat pump applications.

Vapor compression is one type of refrigeration. In its simplest form, vapor compression involves changing the refrigerant from the liquid to the vapor phase through heat absorption at a low pressure and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is inter-changed with that of the refrigeration evaporator.

Certain chlorofluoromethane and chlorofluoroethane derivatives have gained widespread use in refrigeration applications including air conditioning and heat pump applications owing to their unique combination of chemical and physical properties. The majority of refrigerants utilized in vapor compression systems are either single components fluids or azeotropic mixtures. Moreover, certain applications, such as centrifugal chillers, can only use pure or azeotropic refrigerants, since non-azeotropic mixtures will separate in pool boiling evaporators, causing undesirable performance.

Azeotropic or azeotrope-like compositions are desired because they do not fractionate upon boiling. This behavior is desirable because in the previously described vapor compression equipment with which these refrigerants are employed, condensed material is generated in preparation for cooling or for heating purposes. Unless the refrigerant composition exhibits a constant boiling point, i.e. is azeotrope-like, fractionation and segregation will occur upon evaporation and condensation and undesirable refrigerant distribution may act to upset the cooling or heating. If a leak occurs in a refrigeration system during use or service the composition of the azeotrope-like mixture does not change and thus, system pressures and system performance remain unaffected.

The art is continually seeking new fluorocarbon based azeotrope-like mixtures which offer alternatives for refrigeration and heat pump applications. Currently, of particular interest, are fluorocarbon based azeotrope-like mixtures which are considered to be environmentally safe substitutes for the presently used fully halogenated chlorofluorocarbons (CFC's), such as trichlorofluoromethane (R-11), which are suspected of causing environmental problems in connection with the earth's protective ozone layer.

The substitute materials must also possess those properties unique to the CFC's including chemical stability, low toxicity, non-flammability, and efficiency in-use. The latter characteristic is important in refrigeration and air-conditioning especially where a loss in refrigerant thermodynamic performance or energyefficiency may have secondary environmental impacts through increase fossil fuel usage arising from an increased demand for electrical energy. Furthermore, the ideal CFC refrigerant substitute would not require major engineering changes to conventional vapor compression technology currently used with CFC refrigerants.

Mathematical models have substantiated that hydrofluorocarbons, such as pentafluoropropane, including 1,1,2,2,3-pentafluoropropane (HFC-245ca), 1,1,2,3,3-pentafluoropropane (HFC-245ea), 1,1,1,2,3-pentafluoropropane (HFC-245eb) and 1,1,1,3,3,-pentafluoropropane (HFC-245fa) will not adversely affect atmospheric chemistry, because they are a negligible contributor to ozone depletion and to green-house global warming in comparison to the fully halogenated species.

However, HFC-245eb has been found to have flame limits under normal ambient conditions, and HFC-245ca has been found to have flame limits under humid conditions, but not under dry conditions. It has not been confirmed whether or not other pentafluoropropane isomers also exhibit some finite flame propagation behavior in specific, but yet undetermined, environments. This flame propagation behavior would significantly limit the potential use of the pentafluoropropane isomer as an R-11 replacement in chiller applications.

SUMMARY OF THE INVENTION

In accordance with the present invention, novel mixtures have been discovered comprising pentafluoropropane and a perfluorocarbon having 5 to 7 carbon atoms or N-methylperfluoromorpholine or N-ethylperfluoromorpholine. Also, novel azeotrope-like compositions have been discovered comprising pentafluoropropane and a perfluorocarbon selected from the group consisting of perfluoropentane, perfluorohexane and perfluoroheptane or N-methylperfluoromorpholine or N-ethylperfluoromorpholine.

Preferably, the novel azeotrope-like compositions comprise effective amounts of pentafluoropropane and a perfluorocarbon having 5 to 7 carbon atoms or N-methylperfluoromorpholine or N-ethylperfluoromorpholine. The term "effective amounts" as used herein means the amount of each component which upon combination with the other component, results in the formation of the present azeotrope-like compositions.

The preferred, more preferred and most preferred embodiments for each azeotrope-like composition of the invention are set forth in Table I below. The numerical ranges, boiling point and pressures are understood to be prefaced by "about".

TABLE 1

| COMPONENTS | PREF. RANGE (WT. %) | MORE PREF. RANGE (WT.%) | MOST PREF. RANGE (WT.%) | BOILING POINT (° C.) |
|---|---|---|---|---|
| HFC-245ca | 90–50 | 80–50 | 70–50 | |
| perfluoro-pentane | 10–50 | 20–50 | 30–50 | 18 |
| HFC-245ca | 90–50 | 80–50 | 70–50 | |
| perfluoro-hexane | 10–50 | 20–50 | 30–50 | 23 |
| HFC-245ca | 99–75 | 95–80 | 90–80 | |
| perfluoro-heptane | 1–25 | 5–20 | 10–20 | 25 |
| HFC-245ca | 99–75 | 95–80 | 90–80 | |
| N-ethyl-perfluoro morpholine | 1–25 | 5–20 | 10–20 | 25 |
| HFC-245fa | 99–50 | 90–60 | 85–70 | |
| perfluoro-pentane | 1–50 | 10–40 | 15–30 | 10 |
| HFC-245fa | 99–50 | 95–50 | 90–60 | |
| perfluoro-hexane | 1–50 | 5–50 | 10–40 | 15 |
| HFC-245eb | 99.90–80 | 99.9–85 | | |
| perfluoro-heptane | 0.1–20 | 0.1–15 | | 22 |
| HFC-245eb | 90–30 | 80–40 | 70–50 | |
| perfluoro-pentane | 10–70 | 20–60 | 30–50 | 15 |
| HFC-245eb | 99–50 | 90–60 | 85–70 | |
| perfluoro-hexane | 1–50 | 10–40 | 15–30 | 21 |
| HFC-245ea | 99.9–65 | 99–70 | 90–75 | |
| N-methylperfluoro-morpholine | 0.1–35 | 1–30 | 10–25 | 36 |
| HFC-245ea | 99.9–75 | 99–80 | 95–85 | |
| N-ethylperfluoro-morpholine | 0.1–25 | 1–20 | 5–15 | 36.5 |

All compositions within the indicated ranges, as well as certain compositions outside the indicated ranges, are azeotrope-like, as defined more particularly below.

The precise azeotropic compositions have not been determined but have been ascertained to be within the above ranges. Regardless of where the true azeotropes lie, all compositions within the indicated ranges, as well as certain compositions outside the indicated ranges, are azeotrope-like, as defined more particularly below.

Moreover, these compositions were determined to be nonflammable in air at ambient conditions using the ASTM E-681 method as specified in the American Society of Heating, Refrigerating, and Air-Conditioning Engineers (ASHRAE) Standard 34-1992.

Because the present novel compositions exhibit essentially constant-vapor pressure characteristics as the liquid mixture is evaporated and show relatively minor shifts in composition during evaporation, the present compositions are advantageous in a vapor compression cycle as they mimic the performance of a constant-boiling single component or azeotropic mixture refrigerant.

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at the state P and T. In practice, this means that the components of a mixture cannot be separated during a phase change, and therefore are useful in the cooling and heating applications as described above.

For the purpose of this discussion, azeotrope-like composition is intended to mean that the composition behaves like an azeotrope, i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

It should be understood that the azeotrope-like compositions of the present invention may include additional components which do not form new azeotropic or azeotrope-like systems i.e., additional components which are not present in a first distillation cut taken as described below.

One way to determine whether the addition of a component forms a new azeotropic or azeotrope-like system so as to be outside of this invention, is to distill a sample thereof under conditions (i.e. resolution—number of plates) which would be expected to separate the mixture into its separate components. If the mixture containing the additional component is non-azeotropic or non-azeotrope-like, the additional component will fractionate, i.e. separate from the azeotropic or azeotrope-like components. If the mixture is azeotrope-like, some finite amount of a first distillation cut will be obtained which contains all of the mixture components and which is constant-boiling or behaves as a single substance. As used here, the term "first distillation cut" means the first cut taken after the distillation column displays steady state operation under total reflux conditions.

It follows from the above that another characteristic of azeotrope-like compositions is that there is a range of compositions containing the same components in varying proportions which are azeotrope-like or constant-boiling. All such compositions are intended to be covered by the terms "azeotrope-like" or "constant-boiling" as used herein. As an example, it is well known that at differing pressures, the composition of a given azeotrope will vary at least slightly as does the boiling point of the composition. Thus, an azeotrope of A and B represents a unique type of relationship but with a variable composition depending on temperature and/or pressure. As is readily understood by persons skilled in the art, the boiling point of the azeotrope will vary with the pressure.

As such, the present invention meets the need in the art for a refrigerant which has a low ozone depletion potential and is a negligible contributor to green-house global warming compared with fully halogenated CFC refrigerants, is nonflammable, has a COP and capacity comparable to that of R-11, and has a low compressor discharge temperature.

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

Alternatively, the azeotrope-like compositions of the invention may be used in a method for producing heating which comprises condensing a refrigerant comprising the azeotrope-like compositions in the vicinity of a body to be heated and thereafter evaporating the refrigerant.

The azeotrope-like compositions of the present invention may also be used as heat transfer fluids. For example, in certain refrigeration systems it is desirable to operate the system at a specific temperature. However, maintaining the desired temperature may require either the addition or removal of heat. Thus a secondary heating loop containing an appropriate heat transfer fluid may be added. The heat transfer fluid absorbs heat in one part of the cycle and transfers the heat to another part of the cycle without changing state (when the heat transferred is sensible heat) or by changing state (when the heat transferred is latent heat).

In another process embodiment, the azeotrope-like compositions of the present invention are used in a method for producing polyurethane and polyisocyanurate foams. The method comprises reacting and foaming a mixture of ingredients which forms the polyurethane and polyisocyanurate foams in the presence of a volatile blowing agent comprising the azeotrope-like compositions of the present invention. Alternatively, the azeotrope-like compositions of the present invention are used in a premix of polyol and blowing agent. The premix comprises the azeotrope-like compositions of the present invention prior to reaction and foaming of the ingredients forming polyurethane and polyisocyanurate foams. The blowing agents of the present invention are used alone or in a premix with a polyol. Suitable polyols are generally known in the art, as are disclosed for example in U.S. Pat. No. 5,130,345, which is incorporated by reference.

In still other process embodiments, the azeotrope-like compositions of the present invention may be used in a method for producing foam comprising blending a heat plasticised resin with a volatile blowing agent comprising the azeotrope-like compositions of the present invention 1 and introducing the resin/volatile blowing agent blend into a zone of lower pressure to cause foaming.

The azeotrope-like compositions of the present invention may also be used in a method of dissolving contaminants or removing contaminants from the surface of a substrate. This use comprises the step of contacting the substrate with the azeotrope-like compositions of the present invention. The compositions of the present invention may also be used as fire extinguishing agents.

HFC-245ca, HFC-245ea, HFC-245eb, HFC-245fa, perfluoropentane, perfluorohexane, perfluoroheptane, N-methylperfluoromorpholine or N-ethylperfluoromorpholine are each known materials. Preferably, the materials should be used in sufficiently high purity so as to avoid the introduction of adverse influences upon the cooling or heating properties or constant-boiling or the system.

Additional components may be added to the mixture to tailor the properties of the mixture according to the need. For example, in the art, propane has been added to refrigerant compositions to aid oil solubility and may be added to the azeotrope-like compositions of the present invention. Similar materials may be added to the present compositions.

It is also possible to produce thermoplastic foams using the compositions of this invention. For example, conventional foam polyurethanes and isocyanurates formulations are combined with the azeotrope in a conventional manner to produce rigid foams.

The present invention is more fully illustrated by the following non-limiting Examples.

EXAMPLE 1

AZEOTROPE OF 1,1,2,2,3-PENTAFLUOROPROPANE AND PERFLUOROPENTANE

An ebulliometer which consisted of a vacuum jacketed tube with a condenser on the top liter was used. Ten (10.0) grams of 1,1,2,2,3-pentafluoropropane was charged into the ebulliometer and perfluoropentane (3M PF5050) was added in small measured increments by syringe. The temperature was measured using a platinum resistance thermometer.

The following Table II shows the corrected boiling point for various mixtures of 1,1,2,2,3-pentafluoropropane and perfluoropentane. From about 88 to about 55 weight percent pentafluoropropane as shown in Table II, the boiling point of the composition changed by only 1° C. Therefore, the composition behaves as a constant-boiling composition over this range.

TABLE II

| Parts by weight % $CF_2HCF_2CFH_2$ | Parts by weight % $C_5F_{12}$ | Boiling Point (° C.) |
| --- | --- | --- |
| 100.00 | 0 | 25.2 |
| 97.6 | 2.4 | 24.0 |
| 93.1 | 6.9 | 19.0 |
| 90.4 | 9.6 | 21.3 |
| 87.8 | 12.2 | 20.1 |
| 84.2 | 15.8 | 19.9 |
| 79.8 | 20.2 | 19.53 |
| 75.9 | 24.1 | 19.53 |
| 67.5 | 32.5 | 19.40 |
| 60.8 | 39.2 | 19.33 |
| 55.3 | 44.7 | 19.33 |

EXAMPLE 2

AZEOTROPE OF 1,1,2,2,3-PENTAFLUOROPROPANE AND PERFLUOROHEXANE

An ebulliometer which consisted of a vacuum jacketed tube with a condenser on the top liter was used. 1,1,2,2,3-pentafluoropropane (9.7 gm) was charged into the ebulliometer and perfluorohexane was added in small measured increments by syringe. The temperature was measured using a platinum resistance thermometer.

The following Table III shows the corrected boiling point for various mixtures of 1,1,2,2,3-pentafluoropropane and perfluorohexane. From about 95 to about 50 weight percent pentafluoropropane as shown in Table III, the boiling point of the composition changed by only 1° C. Therefore, the composition behaves as a constant-boiling composition over this range.

TABLE III

| Parts by weight % $CF_2HCF_2CFH_2$ | Parts by weight % $C_6F_{14}$ | Boiling Point (° C.) |
| --- | --- | --- |
| 100.00 | 0 | 25.26 |
| 99.1 | 0.9 | 24.87 |
| 98.3 | 1.7 | 24.66 |
| 93.5 | 6.5 | 23.63 |
| 86.5 | 13.5 | 23.26 |
| 80.5 | 19.5 | 23.13 |
| 75.0 | 24.8 | 23.09 |
| 70.6 | 29.4 | 23.08 |
| 62.9 | 37.1 | 23.18 |
| 56.8 | 43.2 | 23.30 |

EXAMPLE 3

AZEOTROPE OF 1,1,2,2,3-PENTAFLUOROPROPANE AND PERFLUOROHEPTANE

An ebulliometer which consisted of a vacuum jacketed tube with a condenser on the top liter was used. 1,1,2,2,3-pentafluoropropane (8.23 gm) was charged into the ebulliometer and perfluoroheptane was added in small measured increments by syringe. The temperature was measured using a platinum resistance thermometer.

The following Table IV shows the corrected boiling point for various mixtures of 1,1,2,2,3-pentafluoropropane and perfluoroheptane. From about 99 to about 70 weight percent pentafluoropropane as shown in Table IV, the boiling point of the composition changed by only 1° C. Therefore, the composition behaves as a constant-boiling composition over this range.

TABLE IV

| Parts by weight % $CF_2HCF_2CFH_2$ | Parts by weight % $C_7F_{16}$ | Boiling Point (° C.) |
|---|---|---|
| 100.00 | 0 | 25.16 |
| 98.9 | 1.1 | 25.01 |
| 96.7 | 3.3 | 25.01 |
| 93.5 | 6.5 | 25.07 |
| 91.5 | 8.5 | 25.16 |
| 89.7 | 10.3 | 25.21 |
| 81.2 | 18.8 | 25.26 |

EXAMPLE 4

AZEOTROPE OF 1,1,2,2,3-PENTAFLUOROPROPANE AND N-ETHYLPERFLUOROMORPHOLINE

An ebulliometer which consisted of a vacuum jacketed tube with a condenser on the top liter was used. 1,1,2,2,3-Pentafluoropropane (10.9 gm) was charged into the ebulliometer and N-ethylperfluoromorpholine was added in small measured increments by syringe. The temperature was measured using a platinum resistance thermometer.

The following Table V shows the corrected boiling point for various mixtures of 1,1,2,2,3-pentafluoropropane and N-ethylperfluoromorpholine. From about 99 to about 80 weight percent pentafluoropropane as shown in Table V, the boiling point of the composition changed by only 1° C. Therefore, the composition behaves as a constant-boiling composition over this range.

TABLE V

| Parts by weight % $CF_2HCF_2CFH_2$ | Parts by weight % $C_2H_5N(C_2F_4(_2O$ | Boiling Point (° C.) |
|---|---|---|
| 100.00 | 0 | 24.85 |
| 98.7 | 1.3 | 24.78 |
| 97.2 | 2.8 | 124.76 |
| 95.7 | 4.3 | 24.74 |
| 94.2 | 5.8 | 24.73 |
| 92.8 | 7.2 | 24.72 |
| 91.5 | 8.5 | 24.73 |
| 90.2 | 9.8 | 24.73 |
| 78.8 | 21.1 | 24.88 |

EXAMPLE 5

REFRIGERANT COEFFICIENT OF PERFORMANCE

This example shows that constant-boiling HFC-245ca/perfluorocarbon blends have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques; see for example, R. C. Downing, FLUOROCARBON REFRIGERANTS HANDBOOK, Chapter 3, Prentice-Hall, 1988. The co-efficient of performance (COP) is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

This type of calculation is performed for a water chiller refrigeration cycle where the condenser temperature is typically 100° F. and the evaporator temperature is typically 35° F. Compression efficiency of 85% saturated cycle is assumed. Such calculations were performed for various combinations of HFC-245ca and a perfluorocarbon having 6 or 7 carbon atoms as well as for R-11. Table VI lists the COP and capacity of the various blends relative to that of R-11. In Table VI, * means that the COP and capacity are given relative to R-11.

TABLE VI

THERMODYNAMIC PERFORMANCE

| Composition HFC-245ca/perfluoro-carbon (by weight) | COP* | Capacity* |
|---|---|---|
| HFC-245ca/$C_6F_{14}$ | 93% | 91% |
| HFC-245ca/$C_7F_{16}$ | 93% | 90% |

As can be seen the HFC-245ca compositions of the present invention are good R-11 alternates.

In addition to being minimally segregating, the azeotrope-like compositions overcome the potential drawbacks of the single component refrigerants. In other words, in contrast to HFC-245ca, the present blends have no flame limits under humid conditions.

EXAMPLE 6

THERMOPLASTIC FOAMS

Thermoplastic foams are made using the pentafluoropropane/perfluorocarbon or pentafluorocarbon/N-ethylperfluoromorpholine compositions shown in Table VII.

TABLE VII

| Components | Proportions (WT %) |
|---|---|
| HFC-245ca/perfluoropentane | 75/25 |
| HFC-245ca/perfluorohexane | 60/40 |
| HFC-245ca/perfluoroheptane | 80/20 |
| HFC-245ca/N-perfluoroethylmorpholine | 90/10 |
| HFC-245fa/perfluoropentane | 60/40 |
| HFC-245fa/perfluorohexane | 70/30 |
| HFC-245eb/perfluoroheptane | 70/30 |
| HFC-245eb/perfluoropentane | 60/40 |
| HFC-245eb/perfluorohexane | 80/20 |

Forty grams of each of the azeotrope-like compositions is charged into a 200 cc sealed vessel containing 3 grams of Dow styrene 685D. The vessel is placed in a 250° F. oven overnight and the pressure is released the next day. A good foam is obtained.

EXAMPLE 7

THERMOSET FOAMS

Polyurethane and polyisocyanurate foams are made using 1,1,2,2,3-pentafluoropropane and a perfluorocarbon or N-ethylperfluoromorpholine. The resulting foam has a fine cell structure and good thermal insulating ability. Further, the other properties of the foam are satisfactory.

To evaluate the feasibility of 1,1,2,2,3-pentafluoropropane/perfluorocarbons or N-ethylperfluoromorpholine in rigid urethane foams hand batch samples is made. The formulation used is a typical rigid urethane and isocyanurate foams (see TABLE VIII and IX). To evaluate these samples typical properties are measured: 1) Density 1b/ft$^3$; 2) K-Factor Btu in/hr ft$^{2\circ}$ F.; 3) Porosity percent open cell; 4) Dimensional Stability 24 hr at −40° C. and +70° C.; 5) Compression PSI ∥ (parallel) and ⊥ (perpendicular to the rise); and 6) Reactivity.

TABLE VIII

HAND BATCH RIGID URETHANE FORMULATION

| INGREDIENT | PARTS BY WEIGHT |
|---|---|
| Pluracol 1042 | 100 |
| Silicone L-5340 | 1.5 |
| Thancat TD-33 | 0.5 |
| Thancat DME | 0.2 |
| Dibutyltin Dilaurate | 0.1 |
| G-11 | 35 |
| Lupranate M2OS (index 1.29) | 117 |

TABLE IX

HAND BATCH RIGID ISOCYANURATE FOAM FORMULATION

| INGREDIENT | PARTS BY WEIGHT |
|---|---|
| Foamol 250 | 100 |
| Silicone L-5340 | 3.3 |
| DMP-30 | 1.3 |
| Foamcat 70 | 4.2 |
| PEG-200 | 11.2 |
| G-11 | 92.0 |
| Mondur MR 200 (index 3.68) | 400 |
| Percent Isocyanurate | 18.0 |

Having described the invention in detail and by reference to preferred embodiments thereof, it will be apparent that modifications and variations are possible without departing from the scope of the invention defined in the appended claims.

What is claimed is:

1. Compositions having azeotropic properties for use as heat transfer agents for heating, cooling, or combinations thereof, which compositions consist essentially of pentafluoropropane, and a second component selected from the group consisting of perfluoropentane, perfluorohexane, perfluoroheptane; wherein said compositions of 1,1,2,2,3-pentafluoropropane and perfluoropentane consist essentially of from about 90 to about 50 weight percent of 1,1,2,2,3-pentafluoropropane and from about 10 to about 50 weight percent of perfluoropentane, which compositions boil at about 18° C. at about 760 mm Hg; and said compositions of 1,1,2,2,3-pentafluoropropane and perfluorohexane consist essentially of about 90 to about 50 weight percent of 1,1,2,2,3-pentafluoropropane, and about 10 to about 50 weight percent of perfluorohexane which compositions boil at about 23° C. at about 760 mm Hg, and said compositions of 1,1,2,2,3-pentafluoropropane and perfluoroheptane consist essentially of about 99 to about 75 weight percent of 1,1,2,2,3-pentafluoropropane, about 1 to about 25 weight percent of perfluoroheptane which compositions boil at about 25° C. at about 760 mm Hg.

2. The compositions of claim 1 wherein said compositions consist essentially of from about 80 to about 50 weight percent of 1,1,2,2,3-pentafluoropropane and from about 20 to about 50 weight percent of perfluoropentane.

3. The compositions of claim 1 wherein said compositions consist essentially of from about 80 to about 50 weight percent of 1,1,2,2,3-pentafluoropropane and from about 20 to about 50 weight percent of perfluorohexane.

4. The compositions of claim 1 wherein said compositions consist essentially of from about 95 to about 80 weight percent of 1,1,2,2,3-pentafluoropropane and from about 5 to about 20 weight percent of perfluoroheptane.

5. The compositions of claim 1 wherein said compositions consist essentially of from about 70 to about 50 weight percent of 1,1,2,2,3-pentafluoropropane and from about 30 to about 50 weight percent of perfluoropentane.

6. The compositions of claim 1 wherein said compositions consist essentially of from about 70 to about 50 weight percent of 1,1,2,2,3-pentafluoropropane and from about 30 to about 50 weight percent of perfluorohexane.

7. The compositions of claim 1 wherein said compositions consist essentially of from about 90 to about 80 weight percent of 1,1,2,2,3-pentafluoropropane and from about 10 to about 20 weight percent of perfluoroheptane.

8. A method for heating or cooling using two-component compositions as direct replacements in conventional equipment for the refrigerant 1,2,3,3,3-pentafluoropropane, wherein said two-component compositions have azeotropic properties for use as heat transfer agents for heating, cooling, or combinations thereof, which method comprises adding a two-component composition consisting of pentafluoropropane and a second component selected from the group consisting of perfluoropentane, perfluorohexane, perfluoroheptane; wherein said compositions of 1,1,2,2,3-pentafluoropropane and perfluoropentane consist of from about 90 to about 50 weight percent of 1,1,2,2,3-pentafluoropropane and from about 10 to about 50 weight percent of perfluoropentane, which compositions boil at about 18° C. at about 760 mm Hg, and said compositions of 1,1,2,2,3-pentafluoropropane and perfluorohexane consist of about 90 to about 50 weight percent of 1,1,2,2,3-pentafluoropropane, and about 10 to about 50 weight percent of perfluorohexane which compositions boil at about 23° C. at about 760 mm Hg, and said compositions of 1,1,2,2,3-pentafluoropropane and perfluoroheptane consists of about 99 to about 75 weight percent of 1,1,2,2,3-pentafluoropropane, about 1 to about 25 weight percent of perfluoroheptane which compositions boil at about 25° C. at about 760 mm Hg.

9. A method for heating or cooling using the composition of claim 2 the method comprising adding as a direct replacement in conventional equipment for the refridgerant 1,2,2,3,3-pentafluoropropane.

10. A method for heating or cooling using the composition of claim 3 the method comprising adding as a direct replacement in conventional equipment for the refrigerant 1,2,2,3,3-pentafluoropropane.

11. A method for heating or cooling using the composition of claim 4 the method comprising adding as a direct replacement in conventional equipment for the refridgerant 1,2,2,3,3-pentafluoropropane.

12. A method for heating or cooling using the composition of claim 5 the method comprising adding as a direct replacement in conventional equipment for the refridgerant 1,2,2,3,3-pentafluoropropane.

13. A method for heating or cooling using the composition of claim 6 the method comprising adding as a direct replacement in conventional equipment for the refridgerant 1,2,2,3,3-pentafluoropropane.

* * * * *